United States Patent

Rabinovich et al.

Patent Number: 5,425,332
Date of Patent: Jun. 20, 1995

[54] PLASMATRON-INTERNAL COMBUSTION ENGINE SYSTEM

[75] Inventors: Alexander Rabinovich, Salem; Daniel R. Cohn, Chestnut Hill; Leslie Bromberg, Sharon, all of Mass.

[73] Assignee: Massachusetts Institute of Technology, Cambridge, Mass.

[21] Appl. No.: 110,057

[22] Filed: Aug. 20, 1993

[51] Int. Cl.$^6$ ............................................. F02B 43/08
[52] U.S. Cl. .................. 123/3; 123/DIG. 12
[58] Field of Search .......................... 123/3, DIG. 12

[56] References Cited

U.S. PATENT DOCUMENTS

| | | | |
|---|---|---|---|
| 4,458,634 | 7/1984 | Carr et al. | 123/DIG. 12 |
| 4,625,681 | 12/1986 | Sutekiyo | 123/DIG. 12 |
| 5,143,025 | 9/1992 | Munday . | |
| 5,159,900 | 11/1992 | Dammann . | |
| 5,207,185 | 5/1993 | Greiner et al. . | |

FOREIGN PATENT DOCUMENTS

| | | | |
|---|---|---|---|
| 3048540 | 7/1982 | Germany | 123/DIG. 12 |
| 8500159 | 1/1985 | WIPO | 123/DIG. 12 |

OTHER PUBLICATIONS

Mischenko, A. I. et al., Proc. VII World Hydrogen Energy Conference, vol. 3 (1988).
Belogub, A. V. and G. B. Talda, Int. J. Hydrogen Energy, vol. 16, 423 (1991).
Feucht, K., W. Hurich, N. Komoschinski, and R. Povel, Int. J. Hydrogen Energy, vol. 13, 243 (1988).
Das, L. M., Int. J. Hydrogen Energy, vol. 16, 765 (1991).

Primary Examiner—Andrew M. Dolinar
Assistant Examiner—Erick Solis
Attorney, Agent, or Firm—Choate, Hall & Stewart

[57] ABSTRACT

Rotary power system. The system includes a source of hydrocarbon fuel which is supplied to a plasmatron which reforms the fuel into a hydrogen-rich gas. An internal combustion engine is connected to receive the hydrogen-rich gas from the plasmatron. The engine powers an electrical generator and the generated electricity is connected to the plasmatron. In one embodiment, the engine also receives hydrocarbon fuel along with the hydrogen rich gas. The combination of plasmatron and internal combustion engine results in lowered exhaust emissions.

8 Claims, 4 Drawing Sheets

PLASMATRON-INTERNAL COMBUSTION ENGINE SYSTEM

BACKGROUND OF THE INVENTION

This invention relates to rotary power systems including a plasmatron for supplying hydrogen-rich gas to an internal combustion engine.

Hydrogen is attractive as a fuel or additive for internal combustion engines because hydrogen as a fuel source can significantly reduce air pollution and can also serve as an alternative energy source to gasoline. See Mishchenko, A. I. et al., Proc. VII World Hydrogen Energy Conference, Vol. 3 (1988), Belogub, A. V. and G. B. Talda, Int. J. Hydrogen Energy, Vol. 16, 423 (1991), Varde, K. S. and L. K. Varde Hydrogen Energy Progress V, Vol. 4 (1984), Feucht, K.,W. Hurich, N. Komoschinski, and R. Povel, Int. J. Hydrogen Energy, Vol 13, 243 (1988), Chuveliov, A. V., In: *Hydrogen Energy and Power Generation*, T. Nejat Veziroglu, Ed., Nova Science Publisher, New York, N.Y. (1991), Das, L. M., Int. J. Hydrogen Energy, Vol 16, 765 (1991). Moreover, engine efficiency can be 10–50% higher when running on hydrogen as compared with a gasoline engine. Prior art systems contemplated either storing hydrogen on-board or generating it on board. On-board storage requires high pressure vessels, cryogenic containers if the hydrogen is to be stored as a compressed gas or liquid, or large getter volumes and weights if the hydrogen is to be stored as a hydride. Moreover, the refill time for hydrogen is substantially longer than that for gasoline when the hydrogen is to be stored on-board.

As to the on-board production of hydrogen, several approaches have been disclosed in the prior art. For example, U.S. Pat. No. 5,143,025 discloses the use of electrolysis to separate water into hydrogen and oxygen and introducing the hydrogen into an internal combustion engine. In U.S. Pat. No. 5,159,900, hydrogen gas is produced by water interaction with solid carbon. Electrical current is passed between the carbon electrodes causing the electrodes to burn and oxidize to form carbon monoxide and hydrogen. U.S. Pat. No. 5,207,185 discloses a burner which utilizes a portion of the hydrocarbon fuel to reform another portion to produce hydrogen. The hydrogen is then mixed with the hydrocarbon fuel for introduction into an internal combustion engine.

Yet another system diverts a fraction of the gasoline from the flow path to the engine and is passed through a catalytic converter and decomposed to yield hydrogen-rich gas. See, Hydrogen: Its Technology and Implications in Vol. 4 (1979). We note that the authors state that this catalytic converter system would not be practical to generate hydrogen as the sole fuel for an engine. This article also suggests other techniques for generating hydrogen on-board a vehicle.

SUMMARY OF THE INVENTION

The rotary power system of the invention includes a source of hydrocarbon fuel and a plasmatron for receiving the hydrocarbon fuel and reforming it into a hydrogen-rich gas. An internal combustion engine receives the hydrogen-rich gas from the plasmatron and a generator powered by the engine delivers electrical energy to operate the plasmatron. Optionally, the engine is connected to receive hydrocarbon fuel directly in addition to the hydrogen rich gas. Thus, the system can be readily switched from 100% hydrocarbon fuel to a mode in which hydrogen-rich gas serves as an additive to the hydrocarbon fuel and then to operation with 100% hydrogen-rich gas. In preferred embodiments, the plasmatron is a water plasmatron utilizing steam reforming of the hydrocarbon source fuel.

Because the plasmatron is highly efficient and also because there is the option to operate in a mode where only part of the hydrocarbon fuel is converted into hydrogen-rich gas, the overall system efficiency remains high even though mechanical energy from the engine is used to power the plasmatron. Based on prior art studies conducted utilizing hydrogen to power internal combustion engines, pollutants can be reduced dramatically. The suitably designed plasmatron according to the invention provides an efficient and compact unit to produce hydrogen-rich gas from gasoline, diesel, and other fuels. The plasmatron utilizes electrical heating of ionized gases, providing a highly controllable means to process hydrocarbon fuel. Use of the plasmatron to produce hydrogen-rich gas eliminates the need for on-board hydrogen storage on motor vehicles and will significantly improve the vehicles' working characteristics without any radical modification of engine design and fuel equipment. In addition to producing hydrogen-rich gas for the engine, the plasmatron provides a means of injecting high temperature combustible gas into the engine which can further increase completeness of combustion thereby further reducing pollutants.

DESCRIPTION OF THE PREFERRED EMBODIMENT

Figure 1:
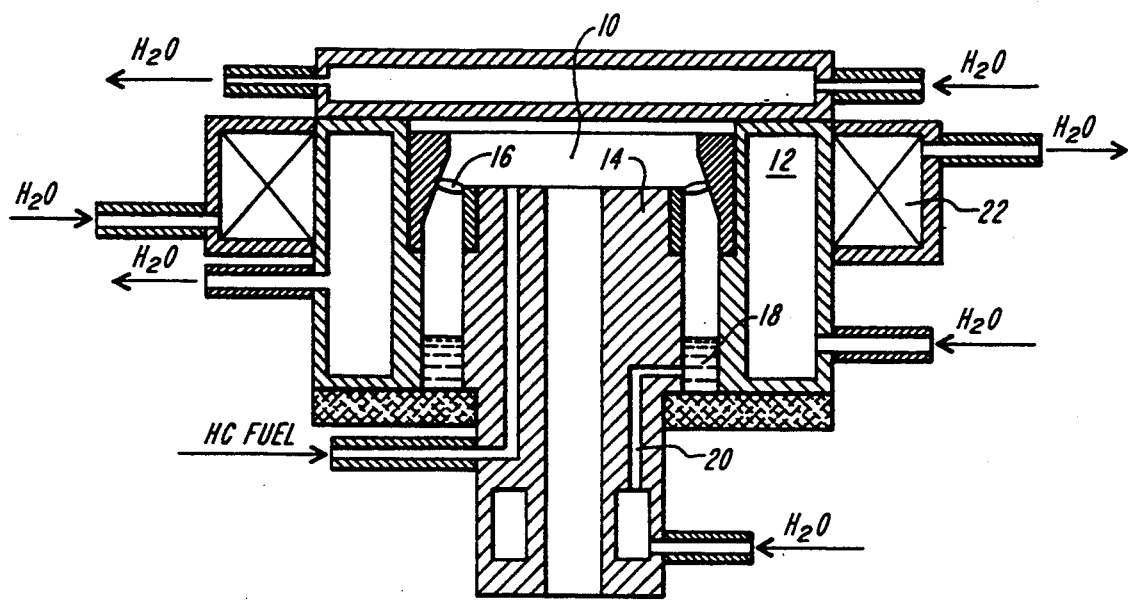
FIG. 1 is a cross-sectional view of a water plasmatron for use in the present invention.

A key aspect of the present invention is a compact plasmatron or reformer which uses a plasma—an electrically heated gas—to convert hydrocarbon fuels into hydrogen-rich gases. One suitable configuration of a compact plasmatron is shown in FIG. 1. A plasmatron 10 includes a cylindrical cathode 12 and an anode 14. Upon energization, a plasma arc 16 is created across the anode 14 and cathode 12. Water 18 resides in the region between the cathode 12 and anode 14 and is fed in through a channel 20. A magnetic coil 22 serves to rotate the arc 16 so that it does not erode the electrodes 12 and 14. An illustrative water plasmatron 10 is described in more detail in U.S.S.R. Patent No. 700935 issued August 1979. See also, Kaskey G. et al., Hydrogen Production by the Huls Plasma-Reforming Process,

*Hydrogen Energy Progress* VI, Vol. 1, July (1986) which describes large-scale plasmatron use. It is expected that compact plasmatrons can produce hydrogen-rich gases from gasoline and other hydrocarbon fuels with greater than 90% efficiency (conversion of electricity into thermal processing energy). The hydrogen content of gas is maximized in a water plasmatron in which steam is the working gas. The output of a plasmatron is typically 75–80% $H_2$ and 20–25% CO. Other configurations of plasmatrons could also be used such as described by D. R. MacRae in *Plasma Chemistry and Plasma Processing*, Vol. 9, No. 1, 1989.

In the plasmatron 10, a mixture of hydrocarbon fuel, hydrogen and water is heated in the plasma 16 to 1,000°–3,000° C. at atmospheric pressure. The high temperature achieved in the plasma increases the desired reaction rates resulting in highly efficient conversion of hydrocarbon fuels into hydrogen-rich gas without the use of catalysts. As a result of the large reaction rates in the plasmatron 10, the size of the plasmatron reformer is substantially decreased making it an ideal component in a vehicular system.

Gaseous or liquid hydrocarbons are convened by steam in the plasma by the reaction:

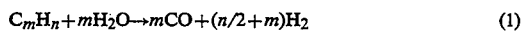

$$C_mH_n + mH_2O \rightarrow mCO + (n/2 + m)H_2 \quad (1)$$

(where m and n represent the relative amounts of carbon and hydrogen) producing a hydrogen-rich gas. Temperatures in the 1,000°–1,700° C. range are required by the reaction kinetics. See, for example, Suris, A. L., *Handbook of the Thermodynamic High Temperature Process Data* (1987). Since it has been demonstrated that the addition of hydrogen to gasoline results in a very complete oxidation of the gasoline, it is also to be expected that the carbon monoxide, CO, would be completely burned. Since the high temperature and substantial hydrogen concentration of plasma gas will improve the efficiency of combustion in the engine it should be possible to utilize lower cost, low octane fuel instead of more expensive, high quality gasoline. Moreover, the plasmatron can process other fuels for internal combustion engines in addition to gasoline. These fuels include ethanol, methanol, natural gas, JP4 and possibly oil and biomass. The capability of the plasmatron to process different fuels provides the option of using fuel from one tank for the generation of hydrogen-rich gas and combining the hydrogen-rich gas with gasoline or some other fuel from another tank.

An illustrative plasmatron system for vehicular application weighs less than approximately 30 kilograms and has a length of approximately 30 centimeters. Plasmatron power levels are in the range of a few kilowatts. The plasmatron 10 can be used in continuous or intermittent operation to optimize performance. A small amount of hydrogen is stored in the intermittent operation mode.

Figure 2:
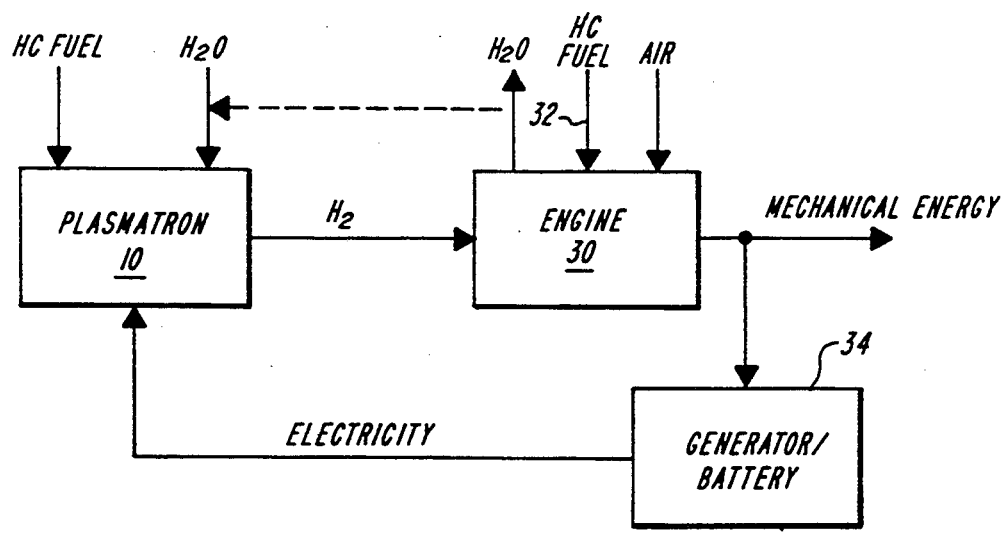
FIG. 2 is a block diagram illustrating the use of hydrogen-rich gas from a plasmatron as an additive to gasoline for an internal combustion engine.

With reference now to FIG. 2, the hydrogen-rich gas from the plasmatron 10 is introduced into an internal combustion engine 30 of conventional design. It is well understood by those skilled in the art how to modify an internal combustion engine to operate on a mixture of hydrogen gas and gasoline or entirely on hydrogen gas. As shown in FIG. 2, in addition to the hydrogen-rich gas from the plasmatron, hydrocarbon fuel 32 is introduced into the engine 30 as well. Some of the mechanical energy produced by the engine 30 is used to run a generator 34, the electrical output of which is connected to the plasmatron 10 for its operation. As discussed in copending application Ser. No. 08/089,038 filed Jul. 9, 1993, the plasmatron 10 requires on the order of 100 volts for its operation.

Figure 3:
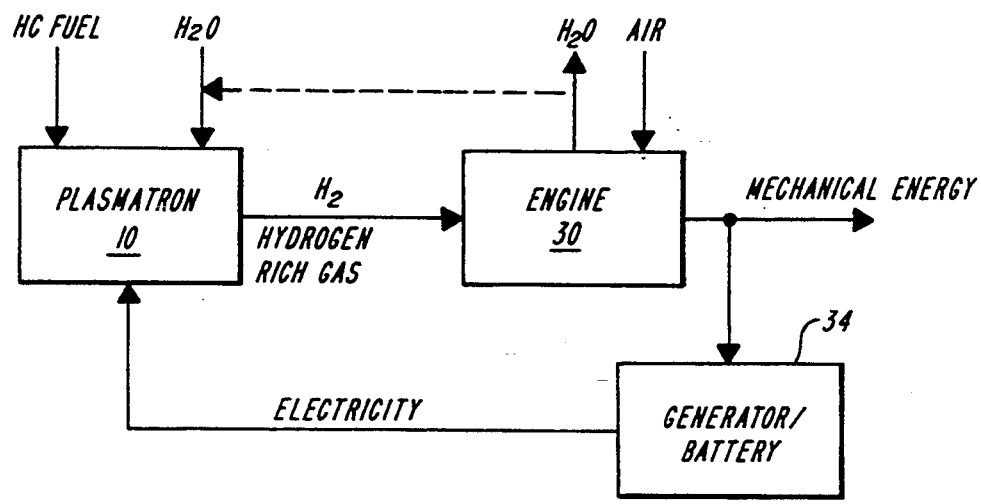
FIG. 3 is a block diagram illustrating use of hydrogen-rich gas from the plasmatron as the sole fuel for an internal combustion engine.
Figure 4:
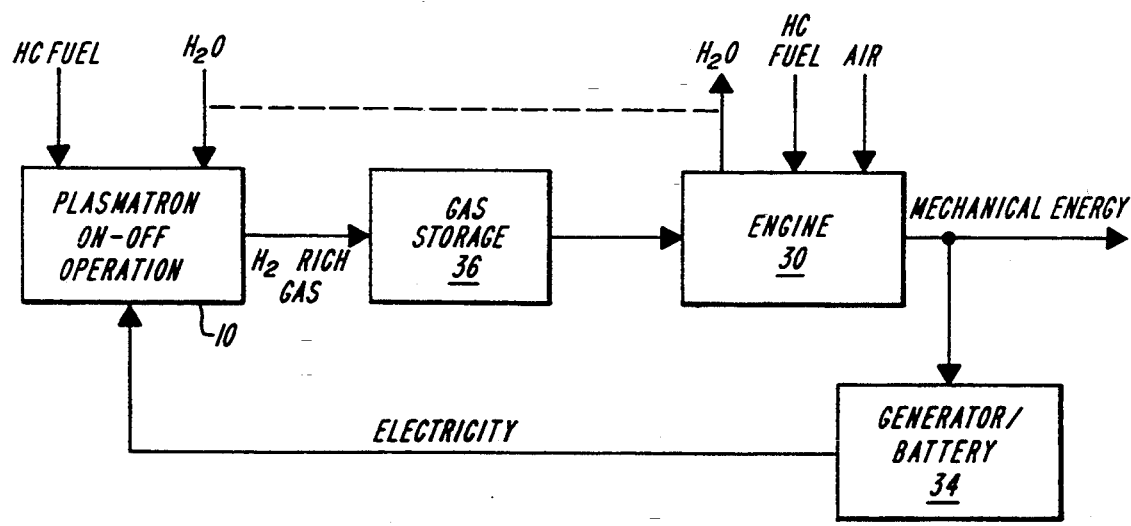
FIG. 4 is a block diagram illustrating intermittent plasmatron use.

With reference now to FIG. 3, the plasmatron 10 generates hydrogen-rich gas which is the sole fuel input to the engine 30. Note that a combustion product of hydrogen, $H_2O$, is supplied to the plasmatron 10 for its operation. As shown in FIG. 4, the plasmatron 10 may be operated intermittently and the hydrogen rich gas stored in a gas storage container 36 allowing the plasmatron to operate where it is most efficient. Gas from the gas storage container 36 is introduced into the engine 30 for use under variable load conditions.

Figure 5:
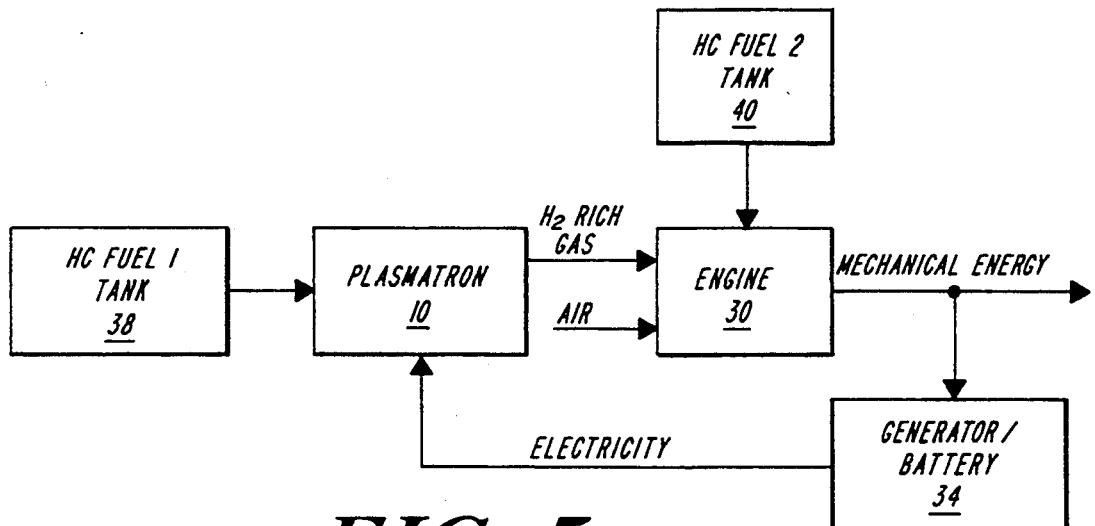
FIG. 5 is a block diagram illustrating operation of a plasmatron internal combustion engine system with different kinds of fuels.
Figure 6:
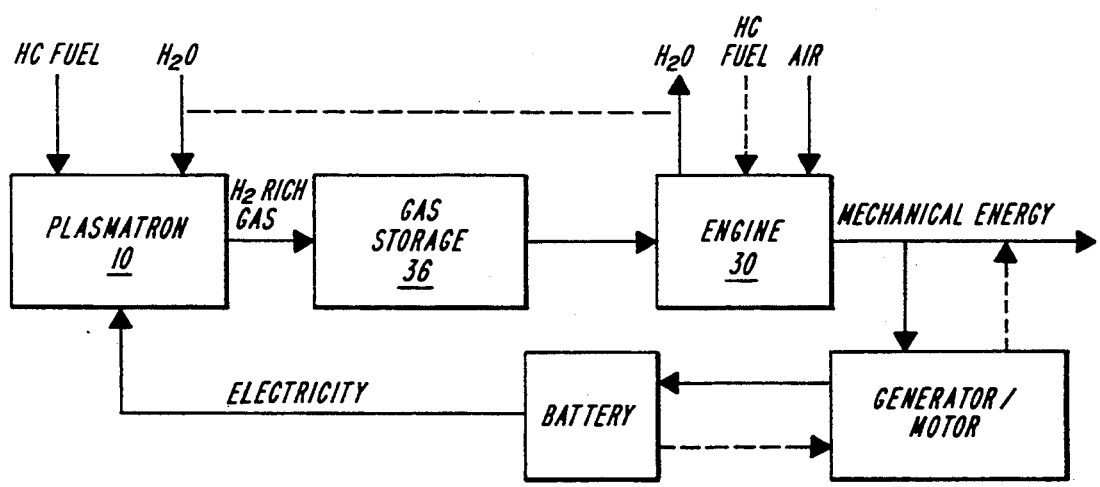
FIG. 6 is a block diagram illustrating use of hydrogen-rich gas from a plasmatron in a hybrid, zero emission vehicle.

The plasmatron 10 (see FIG. 5) can operate on a variety of fuels. Hydrocarbon fuel in a tank 40 may be, for example, low octane, less expensive gasoline. A higher octane gasoline is stored in a second hydrocarbon fuel tank 38. In this mode of operation, the higher quality fuel is reformed into hydrogen-rich gas in the plasmatron 10 and then introduced into the engine 30. Simultaneously, lower quality, less expensive, fuel is delivered to the engine 30 from the tank 40. A hydrogen-rich gas from the plasmatron 10 can be used for the gasoline engine 30 in a hybrid vehicle (see FIG. 6). A hybrid vehicle might use a gasoline engine 30 which is most efficient at steady speeds for sustained highway travel and batteries 42 for city driving.

The prior art has recognized that by optimizing hydrogen-conventional fuel mixtures in an internal combustion engine, it is possible to significantly decrease $NO_x$ and CO by factors of 2–10; CO and $NO_x$ reductions by factors of 5 and 8, respectively, were obtained with hydrogen addition as low as 7% by mass. See the Chuveliov reference cited earlier. Studies of the effect of hydrogen addition on gasoline engine truck operation in town driving were made with engine operation that used a variable amount of hydrogen mass fraction as set forth in the Belogub et al. article cited above. The mass fraction varied from approximately 4% to 20% depending upon engine load. Results from these studies are shown in Table 1:

TABLE 1

| | | | | | | |
|---|---|---|---|---|---|---|
| | | Effects of Hydrogen Addition Upon Gasoline Engine Performance | | | | |
| | | | $H_2$ Consumption kg per 100 km | Toxic Components | | |
| | Payload kg | Petrol Consumption 1 per 100 km | | g kW$^{-1}$h$^{-1}$ | | |
| Fuel | | | | CO | CH | $NO_x$ |
| Petrol | 300 | 34.6 | | 86.3 | 2.98 | 14.8 |
| | 4000 | 38.3 | | | | |
| Petrol/ | 300 | 20.3 | 2.155 | 9.35 | 1.57 | 2.08 |
| $H_2$ | 4000 | 23.2 | 2.305 | | | |

The average mass fraction of hydrogen $m_h/(m_h+m_g)$ where $m_h$ is the hydrogen mass and $m_g$ is the mass of gasoline was 12%. The fuel efficiency (related to the energy content of the gasoline and hydrogen) was 17.5% higher for engine operation with the hydrogen additive relative to operation with gasoline alone.

Due to the many variables involved in internal combustion engine operation, the quantative advantages obtained through the addition of hydrogen can vary substantially. Studies have shown that for gasoline engines, the optimum hydrogen concentration by mass is in the 4–20% range. For mixtures with concentrations above the optimum, strong hydrogen oxidation prevents the oxidation of the hydrocarbonaceous fuels, increasing the emissions. For diesel engines, hydrogen addition slightly increases the $NO_x$ and HC emissions while decreasing the CO and smoke and increasing the efficiency.

Figure 7:
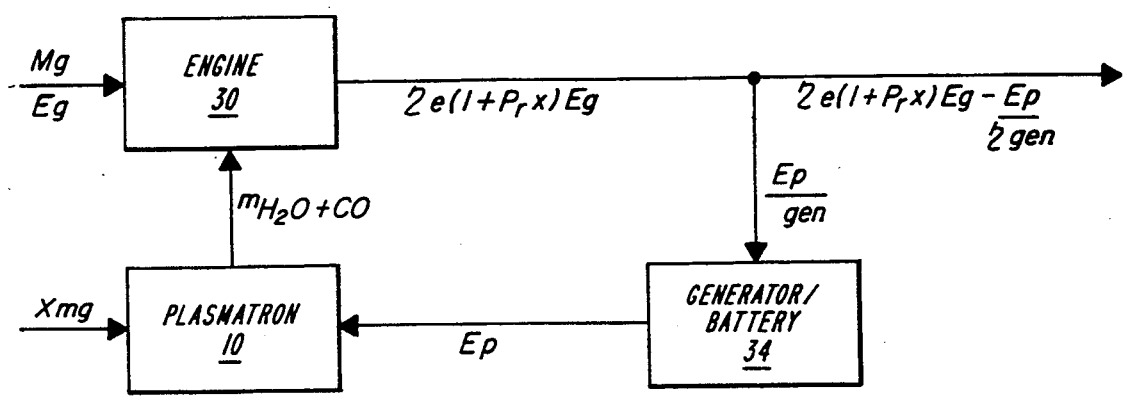
FIG. 7 is a block diagram of energy and mass flow in the system.

The overall system efficiency of the invention has been determined by an energy balance. FIG. 7 shows an illustrative energy and mass flow diagram for the system. In FIG. 7, the variable x is the mass fraction of gasoline into the plasmatron; $p_r$, the ratio of the heating value of hydrogen-rich gas and gasoline, is equal to 1.3. A given mass of gasoline (or some other fossil fuel) is combined with hydrogen-rich gas to create an energy value equivalent of 12% mass fraction of hydrogen. This mass is the average value set forth above in Table 1. The hydrogen-rich gas is produced from gasoline by the plasmatron 10. For example, for the case of around 12% addition of hydrogen gas by mass mentioned previously, the amount of energy that must be added to the gasoline is 16.8 MJ/kg gasoline. This amount of energy would be produced by a 62% mass addition of hyrogen-rich gas. To produce this amount of hydrogen-rich gas it is necessary to process an additional 28% of gasoline according to equation 1.

The electrical energy requirement for the plasmatron 10 to process a given amount of hydrocarbon fuel can be given by the ratio parameter:

$$R_g = \frac{E_g}{E_p} \quad (2)$$

where $E_g$ is the chemical energy content of the gasoline that is processed and $E_p$ is the electrical energy requirement of the plasmatron.

The value of $R_g$ is determined from the specific power requirement for equilibrium steam conversion of liquid hydrocarbons. See, Suris, A. L., *Handbook of the Thermodynamic High Temperature Process Data* (1987). There is a wide range of $R_g$ values that could be applicable. $R_g$ is between 3 and 4 for different grades of gasoline. $R_g$ is 5.7 for methanol. Using the value of $R_g=3.5$ in Eq. (2), the electrical energy requirement of the plasmatron is then $1/3.5\ E_g$.

As mentioned previously, for a given amount of gasoline that is used in the internal combustion engine 30, an amount of gasoline which is approximately 28 percent as much (0.28 Mg) must be processed by the plasmatron 10 to produce the required hydrogen. Therefore, the required plasmatron 10 energy to add 12 percent hydrogen by mass is:

$$E_p = \frac{0.28\ E_g}{R_g} \quad (3)$$

or $$E_p = \frac{0.28\ E_g}{3.5} = 0.08\ E_g$$

The mechanical energy requirement to operate the generator 34 that runs the plasmatron 10 depends upon $E_p$ and $\eta_{gen}$ where $\eta_{gen}$ is the generator 34 efficiency. For $\eta_{gen}=0.9$, the mechanical energy needed to run the plasmatron 10 is:

$$E_{mech,plasma} = \frac{E_p}{0.9} = \frac{0.08\ E_g}{0.9} = 0.09\ E_g$$

The net mechanical energy available for powering a vehicle is:

$$E_{mech,net} = \eta_e(1.36\ E_g) - \frac{E_{plas}}{\eta_{gen}} \quad (4)$$

where $\eta_E$ is the thermal efficiency of the engine 30. The heating value of the fuel that goes into the engine, 1.28 units of gasoline, is increased by the energy added to the 0.28 units with the energy provided by reformation. The total heating value is: $1+0.28\times p_{reformer}=1+0.28\times 1.3=1.36$, where $p_{reformer}$ is the ratio between the heating value of hydrogen-rich gas and gasoline.

Combining (3) and (4), $$E_{mech,net} = \eta_e(1.36\ E_g)\left(1 - \frac{0.28/1.36}{R_g\eta_e\eta_{gen}}\right) \quad (5)$$

If $\eta_e=0.25$ and $\eta_{gen}=0.9$ and $R_g=3.5$ (5) becomes:

$$E_{mech,net}=\eta_e(1.36E_g)(1-0.26)$$

or $E_{mech,net}=0.74\ \eta_e\ (1.36\ E_g)=0.25\ E_g$.

The overall fuel economy of the hydrogen additive engine 30 embodiment is the net mechanical energy divided by the amount of fuel:

$$(\text{fuelefficiency})_{H2+gas} = E_{mech,net}/1.28m_g = 0.20\frac{E_g}{m_g} \quad (6)$$

In contrast, for an engine operating with pure gasoline, it can be assumed that the thermal efficiency would be 17.5 percent lower (Table 1) and that the fuel efficiency of gasoline-only engine operation would be 0.21 $E_g/m_g$. Thus under these assumptions, the addition of hydrogen-rich gas could result in almost the same overall fuel efficiency.

In addition, operation on 100 percent hydrogen-rich gas, either continuously or at selected periods of time, could be attractive for certain special situations.

In general, a variety of tradeoffs between hydrogen mass fraction, compression ratio, timing, and overall system efficiency may provide more optimum operating parameters.

Using advanced control technology (already implemented in modern fuel injected vehicles), it is possible to develop an engine system where operation can be readily switched during driving between 100% gasoline operation, hydrogen additive operation and 100% hydrogen-rich gas operation.

If overall fuel efficiency were, in fact, to be significantly lowered, one option is for vehicles to use the plasmatron-hydrogen pollution reduction option when operating in cities and bypass it when operating in the countryside where $NO_x$ and CO concentrations are lower. A further option is to use the plasmatron-generated hydrogen mainly at rpm ratings, engine temperature and outside air pressure and humidity where exhaust emissions are the largest, where control would have the greatest impact.

The plasmatron-internal combustion engine system will also be useful for hybrid vehicles that use a combination of battery-generated electrical power and an internal combustion engine. In hybrid vehicles, the internal combustion engine can be operated at loads which maximize efficiency ($\eta_e$). However, in ordinary operation with gasoline, there can still be significant amounts of undesirable engine emissions. Use of a plasmatron to produce hydrogen-rich gas would reduce these emissions. Moreover, because the engine would be operating at high efficiency, the effect of the plasmatron electricity requirement on overall power balance would be minimized. In addition, the presence of a significant battery capability in the hybrid vehicle would allow more flexibility in operation of the plasmatron. Operation of the plasmatron for producing 100 percent hydrogen-rich gas would be facilitated. Thus use of a plasmatron-hybrid vehicle system might provide capability approaching zero emission of hydrocarbons, $NO_x$ and CO. In addition, there would be greater flexibility in operating on different types of fuel.

It is thus seen that a plasmatron hydrogen-rich gas generator internal combustion engine system can provide substantial reductions in $NO_x$ and CO emissions and would facilitate the use of fuels other than gasoline. Key features of the system are the possibility of modest or no loss in overall fuel efficiency due to the high efficiency of the plasmatron, the increase in engine efficiency with the use of hydrogen-rich gas, and the option for use of hydrogen as an additive rather than as the entire fuel.

The major contributor to air pollution in the U.S. is the fossil-fuel powered motor vehicle. In 1987, 66 percent of the carbon monoxide emission, 43 percent of $NO_x$ emissions, and 20 percent of particle emissions came from motor vehicles alone. The water plasmatron engine system of the invention for improving fuel combustion in internal combustion engines will have a significant effect on improving air quality.

What is claimed is:

1. Rotary power system comprising:
   a source of hydrocarbon fuel;
   a plasmatron for receiving the hydrocarbon fuel and reforming it into a hydrogen-rich gas;
   an internal combustion engine adapted to receive the hydrogen-rich gas from the plasmatron; and
   a generator powered by the engine and connected to deliver electrical energy to power the plasmatron.

2. The system of claim 1 wherein the engine is connected to receive the hydrocarbon fuel in addition to the hydrogen-rich gas.

3. The system of claim 1 wherein the plasmatron is a water plasmatron.

4. The system of claim 1 further including a gas storage tank for receiving hydrogen-rich gas from the plasmatron and delivering hydrogen-rich gas to the internal combustion engine.

5. The system of claim 1 further including switching apparatus for selecting the relative proportion of hydrogen-rich gas and hydrocarbon fuel entering the engine.

6. Rotary power system comprising:
   a first and a second source of hydrocarbon fuel;
   a plasmatron for receiving hydrocarbon fuel from the first source of hydrocarbon fuel and reforming it into a hydrogen-rich gas;
   an internal combustion engine adapted to receive the hydrogen-rich gas from the plasmatron and to receive hydrocarbon fuel from the second source of hydrocarbon fuel; and
   a generator powered by the engine and connected to deliver electrical energy to power the plasmatron.

7. Rotary power system comprising:
   a source of hydrocarbon fuel;
   a compact plasmatron for receiving the hydrocarbon fuel and reforming it into a hydrogen rich gas;
   an internal combustion engine adapted to receive the hydrogen rich gas from the plasmatron;
   a generator/motor powered by the engine and connected to deliver electrical energy to the battery;
   a battery connected to receive electrical energy from the generator/motor, a portion of electrical energy being supplied to the plasmatron.

8. Rotary power system of claim 7 wherein the generator/motor works as an electric motor receiving electrical energy from the battery to generate mechanical energy.

* * * * *